Patented Jan. 16, 1940

2,187,006

UNITED STATES PATENT OFFICE 2,187,006

POLYMERIZATION OF EPOXY COMPOUNDS

Alfonso M. Alvarado and Harold S. Holt, Wilmington, Del., assignors to E. I. du Pont de Nemours & Company, Wilmington, Del., a corporation of Delaware No Drawing. Application October 5, 1937, Serial No. 167,472

15 Claims. (Cl. 260—2)

This invention relates to a new catalytic polymerization process and more particularly to a new process for polymerizing certain epoxy compounds.

In the application of Rowland Hill, Serial Number 105,444, filed October 13, 1936, there is disclosed a valuable new method for polymerizing hydroaromatic oxides, that is epoxy compounds in which the oxygen is linked to adjacent carbon atoms in a carbocyclic ring. In this method the polymerization process is conducted in the presence of an active earth or clay, these materials being well understood by those skilled in the art to indicate a finely divided, highly adsorbent clay or earth such as bentonite, vermiculite, fuller's earth, or talc, or a diatomaceous silica such as kieselguhr. But it has been found that whether these naturally occurring catalytic materials are operative or satisfactory apparently depends upon their source. Thus, we have found that some samples of earths and clays initiate an uncontrollable reaction at moderate temperatures such as 80–85° C., while other samples do not initiate polymerization at the boiling point of cyclohexene oxide, namely, 133–135° C.

This invention has as an object a new and improved method for preparing valuable polymeric products from epoxy compounds and particularly from compounds containing the epoxy group in which the oxygen is linked to adjacent carbon atoms. A further object is a method for polymerizing these oxides which will be consistently operative with active earths and clays as the catalytic material and which with these catalysts will yield results capable of being readily duplicated and standardized.

These objects are accomplished by heating the epoxy compound at atmospheric pressure and at moderate temperatures in the presence of acid-washed active earths or clays. We have discovered when the catalysts of the kind named above are first treated with acid as described hereinafter that it is possible in all instances to obtain consistent and uniform results in polymerizing, not only the cyclohexene oxide and similar oxides claimed in the above application in which the oxygen is linked to adjacent carbon atoms in a carbocyclic ring, but also in polymerizing other cyclic oxides in which the oxygen is attached to adjacent aliphatic carbon, as for instance, ethylene oxide.

As has been pointed out above the active earths, at least as they are obtained on the market in this country, are not as a rule completely satisfactory since in some instances the reaction is too violent or uncontrollable and since in other instances no reaction takes place. For instance, we heated one sample of diatomaceous silica with cyclohexene oxide at its boiling point for six hours without polymerization of the oxide. A sample of this same diatomaceous silica was then treated with 10% aqueous hydrochloric acid solution, filtered, and washed with water until the washings were neutral to litmus and dried at 105° C. Cyclohexene oxide containing 2% of this "acidic" silica polymerized readily under the conditions described above, giving a resin softening at 65–70° C.

In preparing the catalyst we agitate an active earth or clay such as kieselguhr, fuller's earth, diatomaceous silica, etc., with a dilute aqueous solution of acid of preferably about 10% concentration, filter the clay and wash with water to remove the bulk of the acid, and continue the washing until the filtrate is neutral to litmus. The treated clay is then dried at 105° C. and is ready for use. Epoxy compounds, when heated in the presence of one or two per cent of this material at 110° C., polymerize readily. The following example will serve to illustrate the preparation of a typical resin cyclohexene oxide.

One gram of acid treated silica prepared as described above was mixed with 50 grams of cyclohexene oxide, and the mixture carefully heated with stirring to 110° C. At this point the source of heat was removed and the temperature rose to 115° C. and was maintained there for one-half hour due to the exothermic reaction initiated. At the end of this period the temperature began to fall and external heat was applied to maintain the temperature between 110° and 115° C. for 16 hours. The reaction mixture was then cooled somewhat, dissolved in benzol and filtered to remove the catalyst. The filtrate was distilled to remove the solvent (benzol) leaving a thermoplastic, light-colored resin softening at 65–70° C.

Polymers prepared according to the process described above vary depending on the oxide used as the starting material. The polymer from cyclohexene oxide is a light-colored, thermoplastic resin having a wide range of solubility in organic solvents and a wide range of compatibility with natural and synthetic resins. It is soluble, for example, in gasoline, benzol, toluene, trichlorethylene, and butyl acetate and is compatible in varying proportions with nitrocellulose, ethyl cellulose, chlorinated rubber, ester gum, linseed oil, China-wood oil, alkyd resins, methyl methacrylate, cellulose acetate, urea formaldehyde resins, etc. The properties of the resin can be varied by varying the time of heating in the presence of the catalyst. Short periods (four hours) of heating give a soft thermoplastic, adhesive resin, while longer periods (32 hours) give a more brittle, higher melting resin.

The present invention is applicable to compounds containing the epoxy group in which the oxygen is linked to adjacent carbon atoms. Examples of materials of this type include aliphatic oxides such as ethylene oxide, propylene oxide, butylene oxide, and hydroaromatic oxides such as cyclohexene oxide, dihydronaphthalene oxide, as well as their alkyl-substituted analogs. Compounds of the type mentioned above may be interpolymerized, i. e., a mixture of oxides may be heated in the presence of our catalyst to obtain resins having different properties depending on the oxides used. Our process is, however, more advantageously practiced with the hydroaromatic oxides and in particular cyclohexene oxide.

Of the acid-washed active earths used in this invention the best results are obtained with diatomaceous silica. The acid constituent does not appear to be important since clays washed with sulfuric, hydrochloric, phosphoric or acetic acids will function as catalysts. Acid salts which supply hydrogen ions in aqueous solutions are also included in the scope of this invention.

Polymers as described above are useful as modifying agents for various types of coating and impregnating compositions as for example oil-type varnishes, paints, enamels, nitrocellulose lacquers, synthetic resin finishes, for example alkyd and urea formaldehyde resins, and as modifying agents for ethyl cellulose, cellulose acetate and methyl methacrylate molded articles. These resins are also useful as adhesives for paper, fabric, regenerated cellulose sheeting, metal foil, etc.

The present process of polymerizing aliphatic and hydroaromatic oxides in the presence of acid-washed earths and clays is a valuable improvement over the prior art in that the conditions for polymerization can be standardized and made reproducible.

As many apparently widely different embodiments of this invention may be made without departing from the spirit and scope thereof, it is to be understood that we do not limit ourselves to the specific embodiments thereof except as defined in the appended claims.

We claim:

1. A process for making polymers which comprises heating an epoxy compound in which an oxygen atom is linked to an aliphatic hydrocarbon radical with an acid-washed catalyst of the class consisting of active earths and active clays.

2. The process set forth in claim 1 in which said catalyst is an acid-washed diatomaceous silica.

3. The process set forth in claim 1 in which the epoxy compound is an hydroaromatic oxide.

4. The process set forth in claim 1 in which the epoxy compound is cyclohexene oxide.

5. The steps in a process for making polymers which comprise washing a catalyst of the class consisting of active earths and active clays with aqueous acid and then heating the acid treated catalyst with an epoxy compound in which an oxygen atom is linked to an aliphatic hydrocarbon radical.

6. The steps in the process set forth in claim 5 in which said catalyst is diatomaceous silica.

7. The process set forth in claim 5 in which the epoxy compound is an hydroaromatic oxide.

8. The process set forth in claim 5 in which said epoxy compound is cyclohexene oxide.

9. A process for making polymers which comprises contacting a catalyst of the class consisting of active earths and clays with an aqueous solution of an acid, washing the catalyst to remove the bulk of the acid, drying, and then heating a small amount of the acid-treated catalyst with an epoxy compound in which an oxygen atom is linked to an aliphatic hydrocarbon radical.

10. The process set forth in claim 9 in which said catalyst is diatomaceous silica.

11. The process set forth in claim 9 in which said carbon oxide is an hydroaromatic oxide.

12. The process set forth in claim 9 in which said epoxy compound is cyclohexene oxide.

13. The process set forth in claim 9 in which said catalyst is diatomaceous silica and said oxide is cyclohexene oxide.

14. The process set forth in claim 5 in which said epoxy compound is ethylene oxide.

15. The process set forth in claim 5 in which the epoxy compound is butylene oxide.

ALFONSO M. ALVARADO.
HAROLD S. HOLT.